United States Patent
Horiguchi et al.

[19]

[11] Patent Number: 5,890,993
[45] Date of Patent: Apr. 6, 1999

[54] METHOD OF CONTROLLING THE DOWNHILL RUNNING OF A VEHICLE AND APPARATUS THEREFOR

[75] Inventors: Masanobu Horiguchi; Akira Ikeda, both of Atsugi, Japan

[73] Assignee: Unisia Jecs Corporation, Atsugi, Japan

[21] Appl. No.: 825,916

[22] Filed: Apr. 2, 1997

[30] Foreign Application Priority Data

Apr. 11, 1996 [JP] Japan ................................. 8-089759

[51] Int. Cl.$^6$ .......................... F16H 61/00; F16H 59/66; B60K 41/04
[52] U.S. Cl. ............................................................ 477/94
[58] Field of Search ................................. 477/92, 94, 120

[56] References Cited

U.S. PATENT DOCUMENTS

| | | | |
|---|---|---|---|
| 3,881,368 | 5/1975 | Furuhashi et al. | 477/120 |
| 4,262,783 | 4/1981 | Scarrott et al. | 477/94 |
| 4,350,234 | 9/1982 | Suga et al. | 477/94 |
| 5,016,495 | 5/1991 | Takizawa | 477/94 |
| 5,022,286 | 6/1991 | Takizawa | 477/94 |
| 5,203,235 | 4/1993 | Iizuka | 477/94 |
| 5,287,773 | 2/1994 | Nakawaki et al. | 477/92 |
| 5,428,531 | 6/1995 | Hayafume | 477/94 |
| 5,531,654 | 7/1996 | Ishikawa et al. | 477/92 |
| 5,544,053 | 8/1996 | Nakashima | 477/120 |
| 5,555,170 | 9/1996 | Nakashima | 477/92 |
| 5,611,753 | 3/1997 | Kondo et al. | 477/92 |

FOREIGN PATENT DOCUMENTS

5-231522  9/1993  Japan .

*Primary Examiner*—Dirk Wright
*Attorney, Agent, or Firm*—Foley & Lardner

[57] ABSTRACT

Methods and apparatus for controlling the downhill running of a vehicle judge, based on a running resistance of the vehicle, whether a shift-down operation should be carried out or whether a clutch for transmitting power from drive wheels to an engine should be connected. It is judged whether a driver is requesting deceleration by comparing possible acceleration $\alpha s$ with actual acceleration $\alpha R$. A shift-down operation is executed or a clutch connection is carried out only when it is judged that the shift-down operation should be executed or the clutch connection should be carried out and it is judged that the driver is requesting deceleration. Thus, the shift-down operation control is only carried out when the driver intends to decelerate.

8 Claims, 8 Drawing Sheets

METHOD OF CONTROLLING THE DOWNHILL RUNNING OF A VEHICLE AND APPARATUS THEREFOR

BACKGROUND OF THE INVENTION

1. Field of the Invention

The present invention relates to a method of controlling the downhill running of a vehicle and an apparatus therefor. More specifically, the invention relates to technology for improving the shift-down operation control and for improving the engine brake operation control during the downhill running.

2. Related Art of the Invention

In the speed control operation of an automatic transmission of vehicles, there has generally been employed a system for determining a transmission gear ratio (or speed-change gear) by making a reference to a speed-change map in which has been set in with the transmission gear ratios (or speed-change gears) depending upon the opening degree of the throttle valve and the vehicle speed. However, the mechanism for determining the transmission gear ratio (speed-change gear) has been constituted without at all taking into consideration the changes in the running resistance such as changes of the inclination and the like. In running uphill, for example, an unnecessary shift-up operation is executed by separating the foot away from the accelerator pedal at the time when the vehicle enters into a corner. When running downhill, the gear of the highest speed is selected, which no longer makes it possible to apply the engine brake causing the foot brake to bear an increased burden.

Therefore, a variety of methods have heretofore been proposed for changing the speed-change schedule depending upon the inclination (running resistance). According to the method disclosed in, for example, Japanese Unexamined Patent Publication No. 5-231522, the downhill running state is detected based upon a detection signal from an inclination (acceleration) sensor. Besides, when it is detected that the accelerator pedal has not been depressed, the shift-down operation is executed to effectively apply the engine brake during the downhill running.

According to the method disclosed in the above Japanese Unexamined Patent Publication No. 5-231522, however, the shift-down operation is executed by taking into consideration only the downhill inclination and the fully closed state of the throttle valve. In the following cases, therefore, the driver feels the driving uncomfortable and the operation is carried out involving an uncomfortable feeling.

For example, when running a long straight downhill, the driver may wish to continue the coasting using the gear of the highest speed (e.g., fourth speed) without shifting down the gear. With the above-mentioned conventional transmission, however, the shift-down operation is forcibly executed without reflecting the intention of the driver. Therefore, the driver feels uncomfortable. Alternatively, the driver must depress the accelerator pedal if he intends to drive his car as he likes. The driver feels uncomfortable to a considerable degree if he is forced to depress the accelerator pedal in the downhill running. Besides, such an operation interrupts the control for cutting the fuel during the deceleration running, which is detrimental to fuel efficiency and exhaust performance.

SUMMARY OF THE INVENTION

The present invention was accomplished in view of the circumstances inherent in the prior art, and its object is to provide a method of controlling the downhill running of a vehicle in order to further enhance the downhill running performance of the vehicle by enabling the downhill running such as shiftdown operation control to be executed more in compliance with the intention of the driver than ever before, as well as to provide an apparatus therefor.

In order to accomplish the above-mentioned object according to the method of controlling the downhill running of a vehicle and the apparatus therefor of the present invention, the running resistance of the vehicle is detected, whether the shift-down operation should be executed or not is judged based upon the detected running resistance of the vehicle, the driver's request for deceleration is detected, and the shift-down operation is executed only when it is so judged that the shift-down operation should be executed based on the running resistance of the vehicle and only when the driver's request for deceleration is detected.

Then, even when the vehicle is in a state where it would be so judged that the shift-down operation should be executed based on the running resistance (such as during the downhill running), the driver's intention for deceleration is detected, and the shift-down operation is executed only when the driver is really requesting the shift-down (deceleration) operation but the shift-down operation is inhibited in other cases (when there is no request for deceleration).

This makes it possible to reliably avoid the problem that the shift-down operation is forcibly executed and the driver feels uncomfortable despite the driver's intent to continue the coasting without changing the presently used speed-change gear.

This further makes it possible to reliably avoid undesired operation in which the accelerator pedal must be depressed in the downhill running to keep the vehicle running as desired by the driver, and to reliably eliminate the problem that the fuel-cutting control is interrupted during the deceleration operation due to the above undesired operation adversely affecting the fuel efficiency and exhaust performance. That is, the present invention makes it possible to further improve the downhill running performance of a vehicle compared to that of the prior art.

According to the method of controlling the downhill running of a vehicle and the apparatus therefor of the present invention, the running resistance of the vehicle is detected, whether a clutch for reversely transmitting the power from the drive wheels to the engine should be connected or not is judged based upon the detected running resistance of the vehicle, the driver's request for deceleration is detected, and the clutch is connected only when it is so judged that the clutch should be connected based on the running resistance of the vehicle and only when the driver's request for deceleration is detected.

According to this constitution, even when the vehicle is in a state where it would be so judged that the overrun clutch should be connected (ON) based on the running resistance and the engine brake force is increased (such as during the downhill running), the driver's intention for deceleration is detected, and the overrun clutch is connected only when the driver is really requesting the deceleration but the connection of the overrun clutch is inhibited in other cases (when there is no request for deceleration).

This makes it possible to reliably avoid the problem that the overrun clutch is forcibly connected and the driver feels uncomfortable despite the driver's intent to continue the coasting without changing the presently used speed-change gear.

This further makes it possible to reliably avoid undesired operation in which the accelerator pedal must be depressed in the downhill running to keep the vehicle running as desired by the driver, and to reliably eliminate the problem that the fuel-cutting control is interrupted during the deceleration operation due to the above undesired operation adversely affecting the fuel efficiency and exhaust performance. That is, the present invention makes it possible to further improve the downhill running performance of a vehicle compared to that of the prior art.

The driver's request for deceleration can be detected relying upon the driver's operation for applying the foot brake.

Thus, the driver's request for deceleration is detected to a high precision with a simple and cheap constitution in which a signal for confirming the depression of the foot brake (which may be readily detected by using a brake lamp signal interlocked to the operation for applying brake as is usually done or by using a simply constructed foot brake sensor or the like) is used.

It is further possible to detect the driver's request for deceleration by detecting the braking force produced by applying the foot brake and by comparing the detected braking force with a predetermined value.

Thus, the simple and cheap constitution is employed, and it is made possible to judge that there is a request for deceleration only when the braking force greater than a predetermined level is detected. This makes it possible to avoid such unpractical situations in which it is so detected that the request for deceleration is issued even by erroneous operation caused by noise or even by the driver's slight braking operation. Accordingly, the downhill running performance of the vehicle is further improved.

Here, the braking force produced by the foot brake can be detected based upon the running resistance and the acceleration of the vehicle.

It is thus made possible to detect the driver's request for deceleration at a low cost without using any particular sensor or the like means.

PREFERRED EMBODIMENTS

Embodiments of the present invention will now be described with reference to the accompanying drawings.

Figure 1:
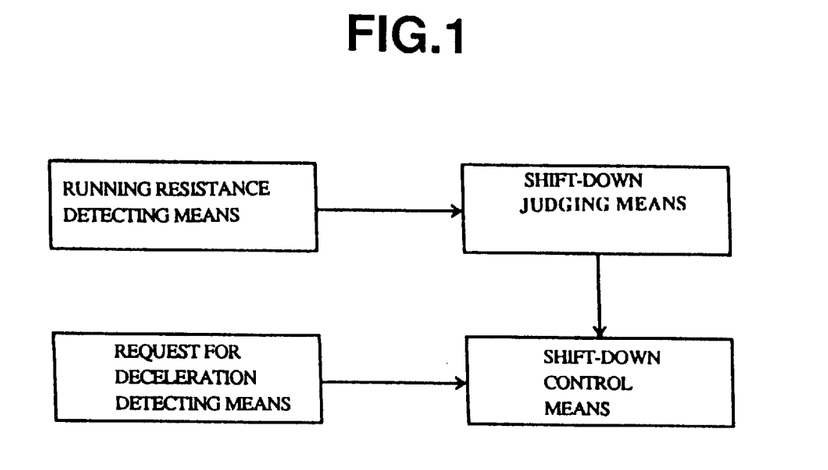
FIG. 1 is a block diagram illustrating the basic constitution of an apparatus for controlling the downhill running of a vehicle according to the present invention.
Figure 2:
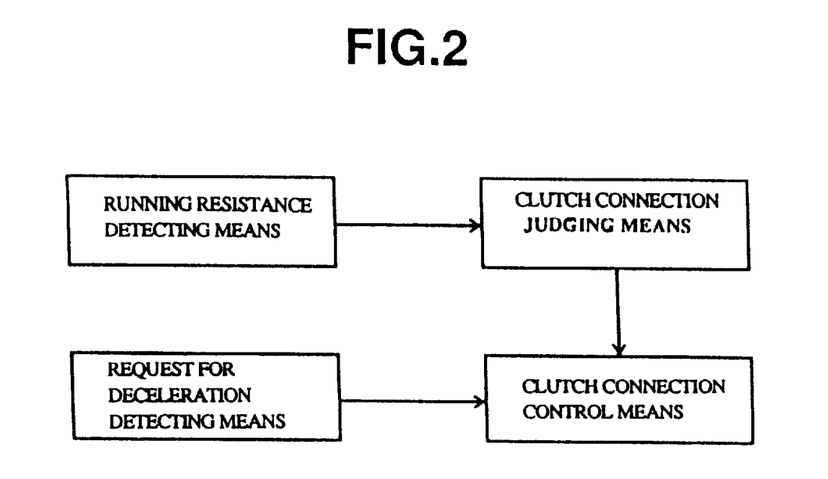
FIG. 2 is a block diagram illustrating the basic constitution of another apparatus for controlling the downhill running of a vehicle according to the present invention.
Figure 3:
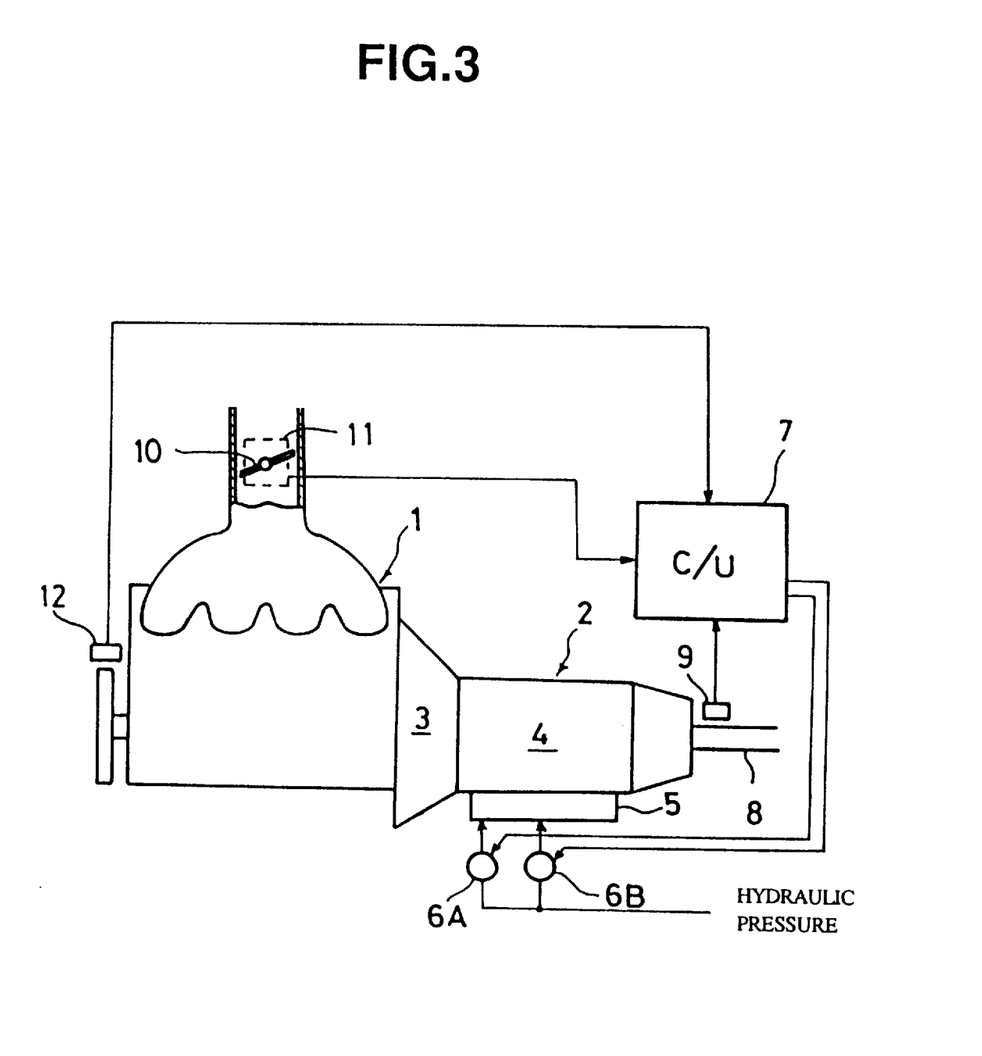
FIG. 3 is a diagram illustrating the constitution of a system according to a first embodiment of the present invention.

Referring to FIG. 3 illustrating the constitution of a system according to a first embodiment, an automatic transmission 2 is provided on the output side of an engine 1. The automatic transmission 2 comprises a torque converter 3 disposed on the output side of the engine 1, a gear-type transmission 4 coupled via the torque converter 3, and a hydraulic actuator 5 for coupling/releasing various speed-change elements in the gear-type transmission 4. The operation pressure for the hydraulic actuator 5 is turned on/off through various electromagnetic valves. Here, however, electromagnetic valves 6A and 6B for shifting only are shown for automatic transmission.

A control unit 7 receives signals from various sensors. For the various sensors, there is provided a vehicle speed sensor 9 for detecting the vehicle speed (number of revolutions of the output shaft) VSP by obtaining revolution signals from an output shaft 8 of the automatic transmission 2.

There is further provided a throttle sensor 11 of the potentiometer type for detecting the opening degree TVO of a throttle valve 10 in the intake system of the engine 1.

Furthermore, a crank angle sensor 12 is provided on the crank shaft of the engine 1 or on a shaft that rotates in synchronism therewith. A signal from the crank angle sensor 12 is a pulse signal produced, for example, for every reference crank angle, and the number of revolutions Ne of the engine is calculated from a period of the pulse signal.

The control unit 7 contains a microcomputer and controls the speed-change operation based upon the signals from the above-mentioned various sensors.

The control unit 7 controls the speed-change operation; i.e., the speed-change gears of the first speed to the fourth speed are automatically set according to a speed-change control routine that will be described later, ON/OFF combination of the electromagnetic valves 6A and 6B for shifting is controlled, and the gear-type transmission 4 is controlled to a speed-change gear corresponding thereto via the hydraulic actuator 5.

Described below are the routine for detecting the running resistance and the routine for the speed-change operation control shown in a flow chart of FIG. 4. These routines are executed for every predetermined period of time. In this embodiment as shown in the flow chart of FIG. 4, the control unit 7 is provided, in a software manner, with the functions of a running resistance detecting means, a shift-down judging means, a request for deceleration detecting means and a shift-down control means of the present invention.

At step (denoted as S in the drawing, the same holds hereinafter) 1, a vehicle speed VSP is detected based upon a signal from the vehicle speed sensor 9.

At step 2, the throttle opening degree TVO (opening degree of the accelerator) is detected based on a signal from the throttle sensor 11.

Next, the routine proceeds to step 3 and to subsequent steps to calculate the running resistance.

At step 3, the turbine torque $Tt_{CGP}$ is calculated, in compliance with a function f (TVO, Nt)(e.g., map characteristics shown in FIG. 5) based on the present throttle opening degree TVO and the number of revolutions Nt of the turbine. The number of revolutions Nt of the turbine may be directly detected by the turbine sensor or may be calculated from the number of revolutions Ne of the engine and the torque converter characteristics. It is prefered that the map is provided for each of the speed-change gears.

At step 4, the drive force (present drive force) F1 with the present speed-change gear (e.g., fourth speed) detected by a gear position sensor, the speed-change control signal and the like, is calculated in compliance with the following formula based on the calculated turbine torque $Tt_{CGP}$, $$F1 = Tt_{CGP} \times CG_{RATIO} \times k$$

where $CG_{RATIO}$ is a gear ratio of the present speed-change gear (e.g., fourth speed) and k is a constant determined by the radius of a tire, etc.

At step 5, the acceleration resistance RESIa is calculated according to the formula, $$RESIa = \Delta VSP \times W \times K$$

where $\Delta VSP$ is an amount of change in the vehicle speed (i.e., acceleration α of the vehicle), W is the weight of the vehicle, and K is a constant.

The acceleration α of the vehicle can also be detected by an acceleration sensor.

Figure 6:
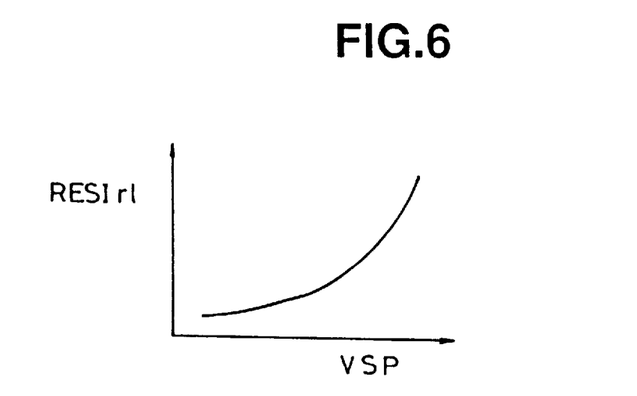
FIG. 6 is a diagram of showing an example of a map for calculating the rolling resistance+air resistance.

At step 6, RESIrL (rolling resistance+air resistance) is calculated from the vehicle speed VSP by making reference to a map shown in FIG. 6.

At step 7, the actual running resistance is obtained by subtracting the acceleration resistance $RESI_a$ and $RESI_{rL}$ (rolling resistance+air resistance) from the present drive force F1, i.e., the running resistance $RESI_{ALL}$ is obtained to be used for judging the final speed-change operation (whether the speed-change gear should be maintained, shift-up operation be executed or shift-down operation should be executed) in compliance with the formula, $$RESI_{ALL} = (F1 - RESI_a - RESI_{rL})$$

Next, the routine proceeds to step 8.

Figure 7:
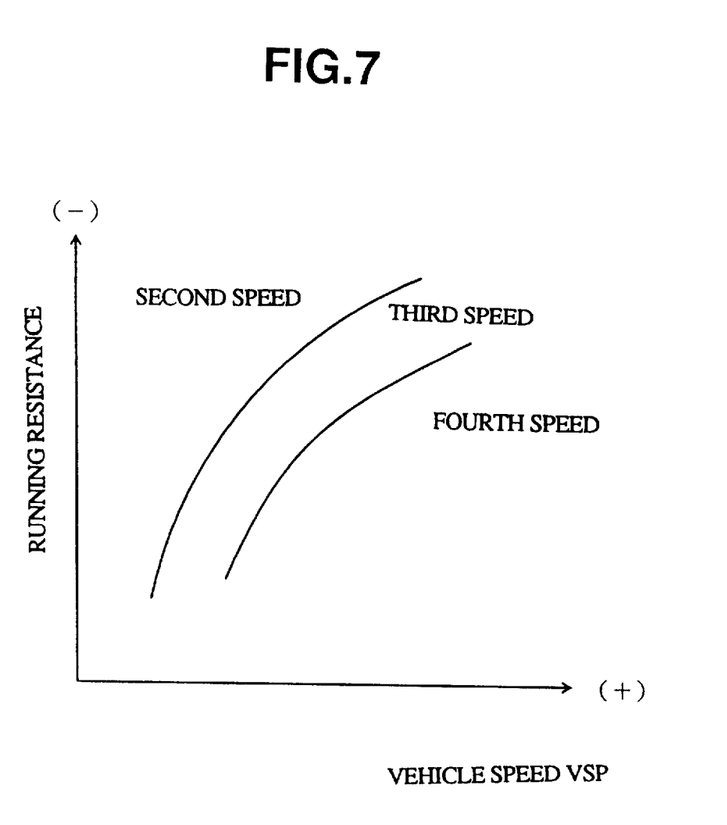
FIG. 7 is a diagram showing an example of a map for judging the shift-down operation.

At step 8, it is judged whether the speed-change gear be maintained, shift-down operation should be executed or shift-up operation should be executed based on the present running resistance $RESI_{ALL}$ by making reference to a map shown in FIG. 7. When it is judged that there is a request for shift-down operation, the routine proceeds to a step 9. In other cases, the ON/OFF combination of the electromagnetic valves 6A, 6B for shifting is controlled to accomplish the requested speed-change operation, and the routine ends.

At step 9, an expected amount of acceleration (an expected acceleration with the present speed-change gear being maintained) αs is obtained based upon the present running resistance $RESI_{ALL}$ prior to executing the shift-down operation. This is obtained, for example, according to the following formula, $$\alpha s = (F1 - RESI_{ALL}) \times G / W$$

where F1 is the above-mentioned drive force (Kgf), $RESI_{ALL}$ is a running resistance (Kgf), G is the gravitational acceleration (m/sec²), and W is the weight (Kg) of the vehicle.

At step 10, a practical acceleration $\alpha_R$ is found. This, however, may be obtained from the amount of change in the vehicle speed ($\Delta VSP$) or may be detected by the acceleration sensor in the same manner as described above.

At step 11, the driver's intention for deceleration is detected. Concretely speaking, a deviation ($\alpha_S - \alpha_R$) between the "expected amount of acceleration $\alpha_S$" and the "actual acceleration $\alpha_R$" is compared with a predetermined value "$\alpha_D$".

That is, when $\alpha_D < (\alpha_S - \alpha_R)$, it is so judged that the deviation is large and the driver is really requesting the deceleration by applying the brake. Therefore, the routine proceeds to a step 12 where the shift-down operation is executed.

On the other hand, when $\alpha_D \geq (\alpha_S - \alpha_R)$, it is so judged that the deviation is small, the driver is not applying the brake, is not requesting the deceleration, and is wishing to continue the coasting in this state running, for example, a long straight downhill. Therefore, the shift-down operation is inhibited, and the routine ends.

According to this embodiment as described above, even when the vehicle is in a state where it would be so judged that the shift-down operation should be executed based on the running resistance (such as during the downhill running), the driver's intention for deceleration is detected, and the shift-down operation is executed only when the driver is really requesting the shift-down (deceleration) operation but the shift-down operation is inhibited in other cases (when there is no request for deceleration). This makes it possible to reliably avoid the problem that the shift-down operation is forcibly executed and the driver feels uncomfortable despite the drivers intent to continue the coasting without changing the presently used speed-change gear. This further makes it possible to reliably avoid undesired operation in which the accelerator pedal must be depressed in the downhill running to keep the vehicle running as desired by the driver, and to reliably eliminate the problem that the fuel-cutting control is interrupted during the deceleration operation due to the above undesired operation adversely affecting the fuel efficiency and exhaust performance. That is, this embodiment makes it possible to further improve the downhill running performance of a vehicle compared to that of the prior art.

Figure 4:
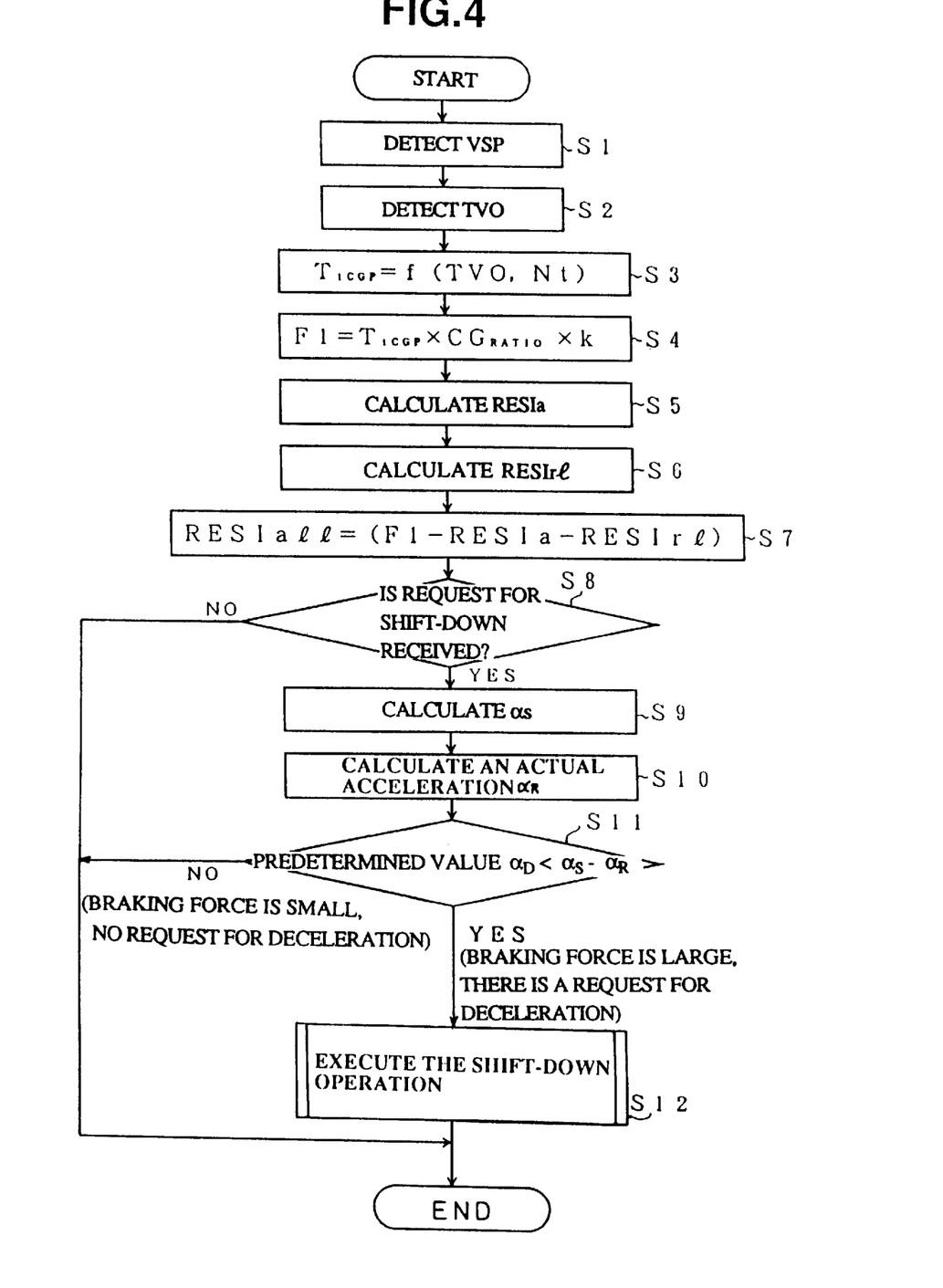
FIG. 4 is a flow chart for explaining a routine for detecting the running resistance and a routine for the speed-change operation control according to the embodiment.
Figure 5:
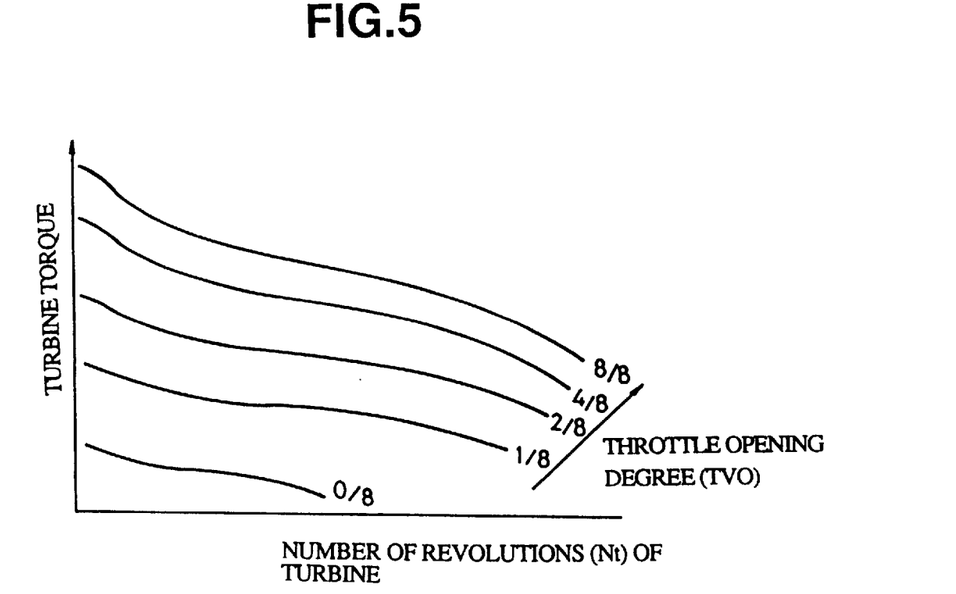
FIG. 5 is a diagram showing an example of a map for calculating the turbine torque.

In steps 9 to 11 in the flow chart of FIG. 4 of this embodiment, the driver's intention for deceleration is detected based upon a deviation between the actual acceleration $\alpha_R$ and the expected acceleration $\alpha_S$ that will be accomplished with the presently used speed-change gear. Not being limited thereto only, however, the driver's intention for deceleration can be detected based, for example, on an ON signal of a brake switch or by comparing the force for depressing the brake pedal (in other words, braking force requested by the driver) detected by a brake pedal depressing force sensor with a predetermined value.

Described below is a second embodiment of the present invention.

In the first embodiment, the speed-change gear is maintained, the shift-down operation is executed or the shift-up operation is executed so that a predetermined vehicle acceleration (running resistance) is obtained during the downhill running. Even when the same speed-change gear is maintained, however, the running resistance (engine brake force) can be varied by connecting or disconnecting the so-called overrun clutch (one-way clutch which transmits the power only when the power force from the engine 1 is transmitted to the drive wheels but inhibits the transmission of power when the power is transmitted from the drive wheels to the engine 1) contained in the gear-type transmission 4.

According to the second embodiment, therefore, the overrun clutch is connected or disconnected (ON/OFF) instead of controlling the speed-change gear as shown in the first embodiment, in order to accomplish a predetermined vehicle acceleration (running resistance) when running the downhill. The basic constitution of the system is the same as that of the first embodiment and is not described here again.

Figure 8:
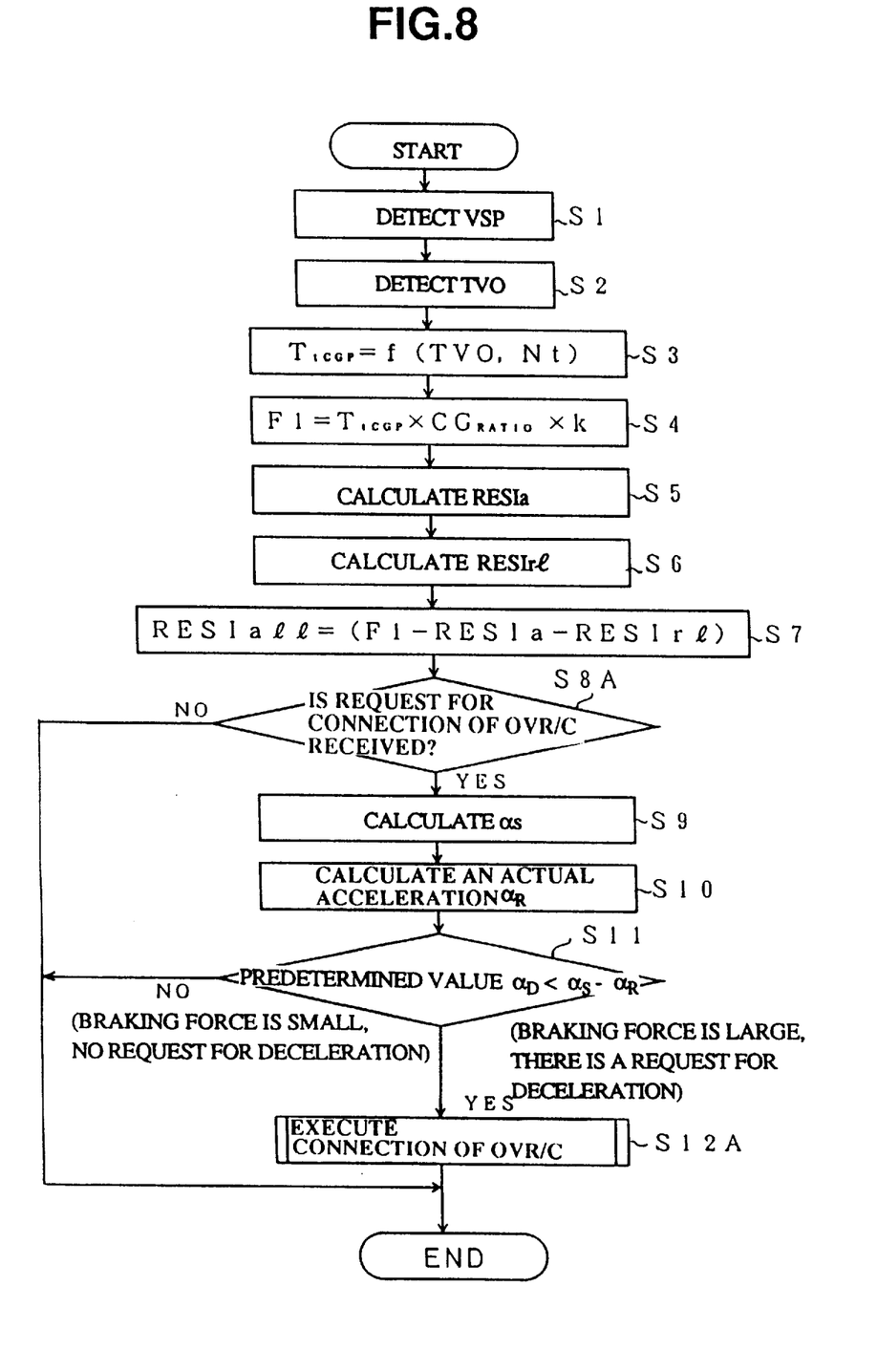
FIG. 8 is a flow chart for explaining a routine for detecting the running resistance and a routine for the speed-change operation control according to a second embodiment of the present invention.

Detecting the running resistance and connecting the overrun clutch according to the second embodiment will now be described with reference to a flow chart of FIG. 8. The control unit 7 is provided, as shown in the flow chart of FIG. 8 and in a software manner, with the functions of a running resistance detecting means, a clutch connection judging means, a request for deceleration detecting means and a clutch connection control means of the present invention.

The steps that execute the same processings as those of steps of the first embodiment are denoted by the same reference numerals as those of the flow chart of FIG. 4 and their description is omitted.

That is, according to the second embodiment, the running resistance is obtained at steps 1 to 7 in the same manner as the first embodiment.

Figure 9:
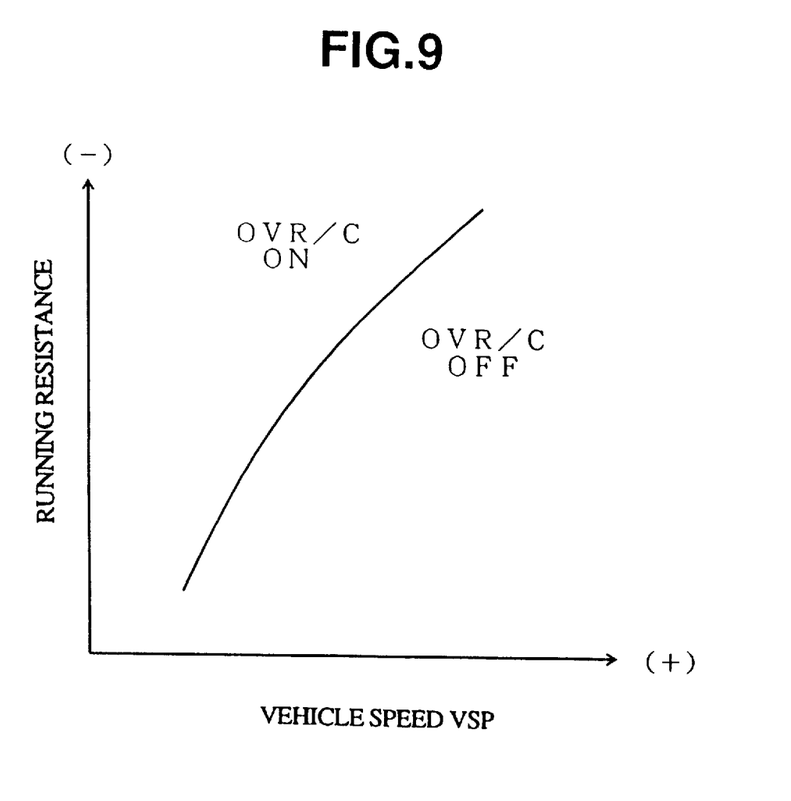
FIG. 9 is a diagram showing an example of a map for judging ON/OFF of an overrun clutch (OVR/C)

At a step 8A, it is judged, based on the present running resistance $RESI_{ALL}$, whether it is necessary to increase the engine brake force by connecting (ON) the overrun clutch (OVR/C) or not by making a reference to a map shown in FIG. 9 (it is prefered that the map is provided for each of the speed-change gears). When it is judged that the overrun clutch must be connected, the routine proceeds to a step 9. In other cases, the overrun clutch is disconnected (OFF) and the routine ends.

At step 9, an expected amount of acceleration (i.e., expected acceleration with the present speed-change gear being maintained) $\alpha_S$ is obtained based on the present running resistance $RESI_{ALL}$ like in the first embodiment prior to connecting (ON) the overrun clutch.

At step 10, an actual acceleration $\alpha_R$ is obtained in the same manner as in the first embodiment. The acceleration $\alpha_R$ may be found from the amount of change in the vehicle speed ($\Delta VSP$) or may be detected by using the acceleration sensor.

At step 11, the driver's intention for deceleration is detected in the same manner as in the first embodiment.

When it is so judged that the driver is really requesting the deceleration (increase of an engine brake force) by operating the brake pedal, the routine proceeds to step 12A where the overrun clutch is connected (ON).

When it is judged that the driver is not requesting the deceleration but is wishing to continue the coasting in this state running, for example, a long straight downhill, the overrun clutch is not connected (ON) and the routine ends.

According to this constitution, even when the vehicle is in a state where it would be so judged that the overrun clutch should be connected (ON) based on the running resistance and the engine power force be increased (such as during the downhill running), the driver's intention for deceleration is detected, and the overrun clutch is connected only when the driver is really requesting the deceleration but the connection of the overrun clutch is inhibited in other cases (when there is no request for deceleration). This makes it possible to reliably avoid the problem that the overrun clutch is forcibly connected and the driver feels uncomfortable despite the driver's intent to continue the coasting without changing the presently used speed-change gear. This further makes it possible to reliably avoid undesired operation in which the accelerator pedal must be depressed in the downhill running to keep the vehicle running as desired by the driver, and to reliably eliminate the problem that the fuel-cutting control is interrupted during the deceleration operation due to the above undesired operation adversely affecting the fuel efficiency and exhaust performance. That is, this embodiment makes it possible to further improve the downhill running performance of a vehicle compared to that of the prior art.

The above-mentioned embodiments have dealt with the gear-type transmission 4 for selectively changing over the speed-change gear in a stepped manner. The invention, however, can also be adapted even to the pulley-type continuously variable transmission which makes it possible to set any speed-change ratio.

The present invention can be applied even to the torque converter 3 equipped with a lock-up should mechanism in which it is determined whether the lock-up be executed or not based on the running resistance during the downhill running, so that a desired acceleration can be obtained. That is, even when it is so judged that the lock-up be executed, the lock-up should operation is inhibited when the driver does not intend to decelerate. This makes it possible to reliably avoid such an inconvenience that the torque converter is locked up against the intention of the driver, and the running resistance (acceleration of the vehicle, engine brake force) is changed causing the driver to feel uncomfortable.

Figure 10:
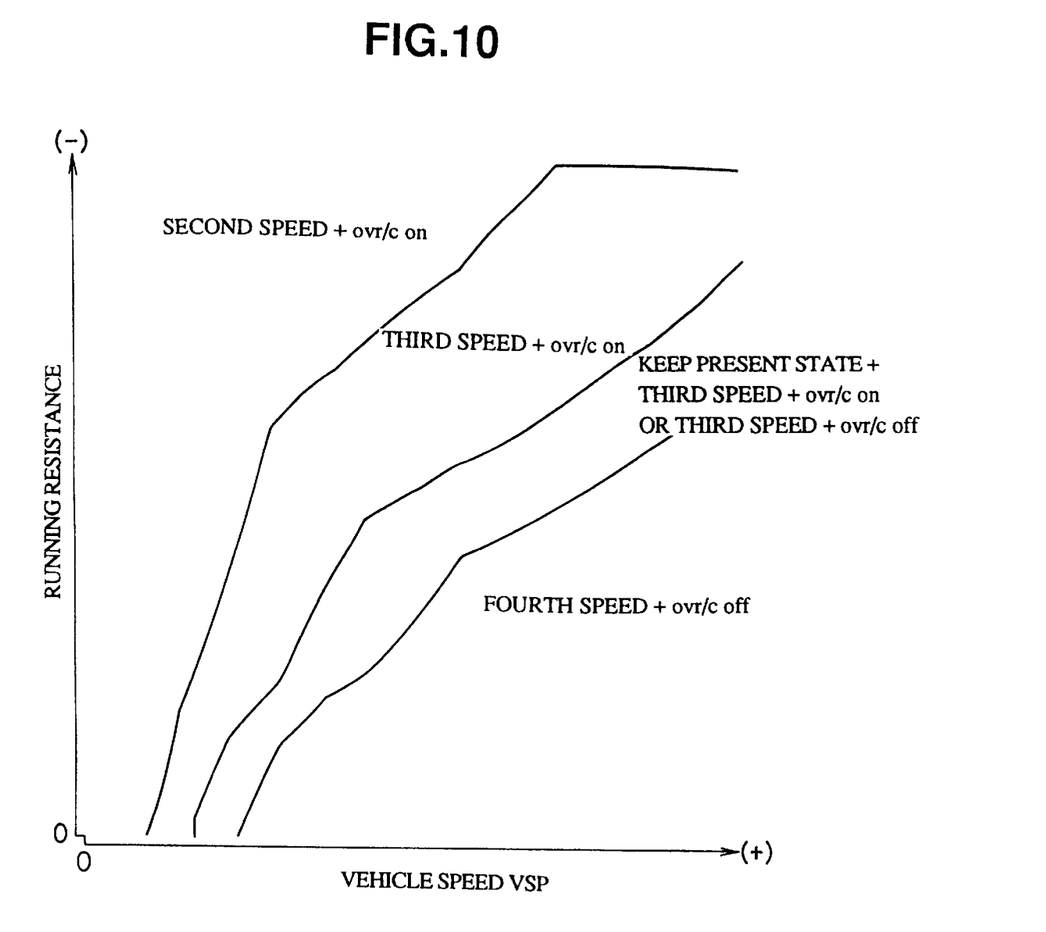
FIG. 10 is a diagram showing an example of a map for judging the shift-down operation and the ON/OFF of the overrun clutch (OVR/C) in combination.

The above-mentioned embodiments have separately dealt with the shift-down operation control and the overrun clutch operation control. By using a map shown in FIG. 10, however, it is also possible to determine whether the shift-down operation should be executed, whether the overrun clutch should be connected, or whether both of them should be executed simultaneously to carry out the first embodiment and the second embodiment in combination, as a matter of course.

We claim:

1. A method of controlling downhill running of a vehicle, the method comprising the steps of:

judging, based on a running resistance of the vehicle, whether a shift-down operation should be executed;

calculating a possible acceleration $\alpha s$ based on the running resistance of the vehicle and a drive force of the vehicle;

judging whether a driver is requesting deceleration by comparing the possible acceleration $\alpha s$ with an actual acceleration $\alpha R$; and executing the shift-down operation only when it is judged, based on the running resistance, that the shift-down operation should be executed and it is judged that the driver is requesting deceleration.

2. A method of controlling downhill running of a vehicle according to claim 1, wherein it is judged that a driver is requesting deceleration when ($\alpha s - \alpha R$) is greater than a predetermined value.

3. A method of controlling downhill running of a vehicle, the method comprising the steps of:

judging, based on a running resistance of the vehicle, whether a clutch for transmitting power from drive wheels to an engine should be connected;

calculating a possible acceleration as based on the running resistance of the vehicle and a drive force of the vehicle;

judging whether a driver is requesting deceleration by comparing the possible acceleration $\alpha s$ with an actual acceleration $\alpha R$; and carrying out a clutch connection only when it is judged, based on the running resistance, that the clutch should be connected and it is judged that the driver is requesting deceleration.

4. A method of controlling downhill running of a vehicle according to claim 3, wherein it is judged that a driver is requesting deceleration when ($\alpha s - \alpha R$) is greater than a predetermined value.

5. An apparatus for controlling downhill running of a vehicle, comprising:
   a running resistance detecting means for detecting a running resistance of a vehicle;
   a shift-down operation judging means for judging, based on the detected running resistance, whether a shift-down operation should be executed;
   a possible acceleration calculating means for calculating a possible acceleration $\alpha s$ based on the detected running resistance and a drive force of the vehicle;
   an actual acceleration detecting means for detecting an actual acceleration $\alpha R$ of the vehicle;
   a request-for-deceleration judging means for judging whether a driver is requesting deceleration based on the possible acceleration $\alpha s$ and the actual acceleration $\alpha R$; and
   a shift-down control means for executing the shift-down operation only when it is judged by the shift-down operation judging means that the shift-down operation should be executed and it is judged by the request-for-deceleration judging means that the driver is requesting deceleration.

6. An apparatus for controlling downhill running of a vehicle according to claim 5, wherein it is judged that the driver is requesting deceleration when ($\alpha s - \alpha R$) is greater than a predetermined value.

7. An apparatus for controlling downhill running of a vehicle, comprising:
   a running resistance detecting means for detecting a running resistance of a vehicle;
   a clutch connection judging means for judging, based on the detected running resistance, whether a clutch for transmitting power from drive wheels to an engine should be connected;
   a possible acceleration calculating means for calculating a possible acceleration $\alpha s$ based on the detected running resistance and a drive force of the vehicle;
   an actual acceleration detecting means for detecting an actual acceleration $\alpha R$ of the vehicle;
   a request-for-deceleration judging means for judging whether a driver is requesting deceleration based on the possible acceleration $\alpha s$ and the actual acceleration $\alpha R$; and
   a clutch connection control means for connecting the clutch only when it is judged by the clutch connection judging means that the clutch should be connected and it is judged by the request-for-deceleration judging means that the driver is requesting deceleration.

8. An apparatus for controlling downhill running of a vehicle according to claim 7, wherein it is judged that the driver is requesting deceleration when ($\alpha s - \alpha R$) is greater than a predetermined value.

* * * * *